(12) United States Patent
Inoue et al.

(10) Patent No.: US 6,730,154 B2
(45) Date of Patent: May 4, 2004

(54) POLYCHROMIC INK COMPOSITION DEPENDING ON VIEWING ANGLE

(75) Inventors: Hiroshi Inoue, Higashiosaka (JP); Satoshi Maruyama, Yao (JP); Norihiro Hirano, Higashiosaka (JP); Hidetoshi Fukuo, Yao (JP); Naoshi Murata, Higashiosaka (JP); Shoko Matsumoto, Shijonawate (JP); Kaoru Matsumoto, Shijonawate (JP)

(73) Assignee: Sakura Color Products Corporation, Osaka-fu (JP)

( * ) Notice: Subject to any disclaimer, the term of this patent is extended or adjusted under 35 U.S.C. 154(b) by 0 days.

(21) Appl. No.: 09/834,712

(22) Filed: Apr. 13, 2001

(65) Prior Publication Data

US 2002/0033117 A1 Mar. 21, 2002

(30) Foreign Application Priority Data

| | | | |
|---|---|---|---|
| Apr. 13, 2000 | (JP) | | 2000-112589 |
| Sep. 13, 2000 | (JP) | | 2000-277752 |
| Oct. 12, 2000 | (JP) | | 2000-312595 |
| Nov. 15, 2000 | (JP) | | 2000-348558 |
| Dec. 22, 2000 | (JP) | | 2000-391415 |

(51) Int. Cl.$^7$ .......................... C09D 11/00; C09D 11/14
(52) U.S. Cl. ...................... 106/31.68; 106/31.28; 106/31.6
(58) Field of Search ............... 106/31.28, 31.6, 106/31.68, 31.64, 31.65, 31.7, 404

(56) References Cited

U.S. PATENT DOCUMENTS

| | | | | | |
|---|---|---|---|---|---|
| 5,084,351 | A | * | 1/1992 | Philips et al. | 156/289 |
| 5,383,995 | A | * | 1/1995 | Phillips et al. | 156/230 |
| 5,424,119 | A | * | 6/1995 | Phillips et al. | 264/108 |
| 5,614,465 | A | * | 3/1997 | Long et al. | 349/106 |
| 5,648,165 | A | * | 7/1997 | Phillips et al. | 428/200 |
| 6,307,676 | B1 | * | 10/2001 | Merrill et al. | 359/490 |
| 2002/0096083 | A1 | * | 7/2002 | Spencer et al. | 106/31.9 |

FOREIGN PATENT DOCUMENTS

| | | |
|---|---|---|
| JP | 7-118592 | 5/1995 |
| JP | 8-151547 | 6/1996 |

\* cited by examiner

*Primary Examiner*—Helene Klemanski
*Assistant Examiner*—Veronica F. Faison
(74) *Attorney, Agent, or Firm*—Merchant & Gould, P.C.

(57) ABSTRACT

A polychromic ink composition depending on viewing angle comprises 0.5 to 40% by weight of cholesteric liquid crystal polymer particles whose maximum particle diameter is 1 to 200 $\mu$m, 1.0 to 30.0% by weight of binder resins, 0.05 to 20% by weight of pigments with a deep-colored coloring matter whose average particle diameter is 0.01 to 0.5 $\mu$m, 0.01 to 5.0% by weight of a shear-thinning property imparting agent, and water with respect to the total amount of the ink composition.

37 Claims, No Drawings

POLYCHROMIC INK COMPOSITION DEPENDING ON VIEWING ANGLE

BACKGROUND OF THE INVENTION

1. Field of the Invention

The present invention relates to a polychromic ink composition depending on viewing angle which can be suitably used for writing instruments, stamps, paints, cosmetics, or the like.

2. Description of the Prior Art

Heretofore, for the purpose of obtaining written marks with metallic color such as gold, silver, or the like, and with pearlescent luster, ink compositions using metallic pigments or pearlescent pigments have been proposed. For example, Japanese Unexamined Patent Publication No. 7-118592 proposes an aqueous ink composition using aluminum pigments. Further, Japanese Unexamined Patent Publication No. 8-151547 proposes an aqueous ink composition using pearlescent pigments.

However, in the case of such conventional aqueous ink compositions using metallic pigments, it has been impossible to obtain written marks or coating films with an effect that different colors are to be perceived depending on viewing angle (polychroism depending on viewing angle: goniochromism). Although ink compositions using pearlescent pigments have pearlescent luster, polychroism depending on viewing angle is hardly perceived. In particular, no polychroism depending on viewing angle can be perceived when a substrate whose color reflects light, including a white-colored substrate. On the other hand, in order to prepare ink compositions preferably used for writing instruments or the like including ball-point pens, it is important to prepare inks with good dispersal stability, capable of preventing the sedimentation of the pigment particles and excellent in maintenance stability whether they are oily types or aqueous types.

SUMMARY OF THE INVENTION

The present invention relates to a polychromic ink composition depending on viewing angle comprising polychromic particles depending on viewing angle, in particular, polychromic particles depending on viewing angle having optical reflection layers, solvents, and shear-thinning property imparting agents. Here, the polychromic particles depending on viewing angle in the present invention are defined as the particles which show such an effect that different colors are to be perceived depending on viewing angle (polychroism depending on viewing angle: goniochromism). When the ink composition of the present invention comprising these particles, solvents, and shear-thinning property imparting agents is written or coated, the written marks or coating films contain polychromic particles depending on viewing angle. Consequently, when incident light comes into these particles which are contained in the written marks or coating films, light coming out from inside of the particles to outside of the particles strongly interferes and interference color is observed in which different colors are to be perceived depending on viewing angle, thereby obtaining written marks or coating films with polychroism depending on viewing angle that have not been attained in the past.

In particular, as a mode of preferred embodiment, in the ink composition wherein the polychromic particles depending on viewing angle having optical reflection layers are contained, these optical reflection layers function as an opacifying agent of the said particles by themselves, and the polychroism depending on viewing angle can be observed regardless of the color of the substrate including colorants or the like which are written or coated at the same time as an ink. In other words, in the case of these particles, regardless of the color of the substrate, the interference color can be observed in which different colors are perceived depending on viewing angle due to the light coming out from inside of the particles to the outside of the particles, thereby obtaining the written marks or coating films that have not been attained by using the conventional metallic pigments or pearlescent pigments. In particular, even in the case of a white-colored substrate which reflects light, as a result of specular reflection of the incident light or as a result that light is reflected partially, written marks or coating films with polychroism depending on viewing angle can be obtained. Here, "polychromic particles depending on viewing angle having optical reflection layers" refer to the polychromic particles depending on viewing angle having one or more optical reflection layers that can reflect specularly or that can reflect light partially when the light comes into, is refracted, and transmitted. Preferably, the "polychromic particles depending on viewing angle having optical reflection layers" refer to the polychromic particles depending on viewing angle having such optical reflection layers whose reflectance is greater than transmittance of the incident light.

In addition, since the ink composition of the present invention is the ink composition which comprises solvents and shear-thinning property imparting agents as well as polychromic particles depending on viewing angle, such an ink is prepared whose dispersal stability of the said polychromic particles depending on viewing angle is good, capable of preventing the sedimentation of the said particles, excellent in maintenance stability. As a particularly preferred mode of embodiment, in the case of an ink composition comprising polychromic particles depending on viewing angle consisting of multi-layered particles including several metallic components, although the specific gravity is larger compared with that of ordinary pigments and that of pigment particles comprising the simple substance metals including aluminum or the like, when such an ink composition comprising polychromic particles depending on viewing angle contains a shear-thinning property imparting agent, the sedimentation of the said particles can be prevented, thereby obtaining an ink excellent in maintenance stability. Further, as a particularly preferred mode of embodiment, in the case of an ink composition comprising polychromic particles depending on viewing angle comprising the said cholesteric liquid crystal polymer, although the particle diameter is larger compared with that of pigments which are used for felt-tip pens and ball-point pens, when such an ink composition comprising polychromic particles depending on viewing angle contains shear-thinning property imparting agents, the sedimentation of the said particles can be prevented, and the maintenance stability becomes good, thereby obtaining an ink excellent in practical use which is applied for writing instruments including ball-point pens or the like.

The object of the present invention is to provide a polychromic ink composition depending on viewing angle which can obtain written marks or coating films having polychroism depending on viewing angle which have not been realized by using the conventional metallic pigments or pearlescent pigments.

Another object of the present invention is to provide a polychromic ink composition depending on viewing angle which can obtain written marks or coating films having polychroism depending on viewing angle particularly on a white-colored substrate.

The other object of the present invention is to provide a polychromic ink composition depending on viewing angle capable of attaining each of the above described objects with good dispersal stability, capable of preventing the sedimentation of the pigment particles, and showing the excellent maintenance stability.

DESCRIPTION OF THE PREFERRED EMBODIMENT

Polychromic Particles Depending on Viewing Angle

As described above, polychromic particles depending on viewing angle of the present invention (polychromic pigments depending on viewing angle/dichroic pigments) are defined as a generic term of pigment particles in which the color tone (interference color) changes depending on viewing angle. The examples include multi-layered pigments such as minerals, metals, metallic compounds, and metal oxides, liquid crystal polymers, and multi-layered body of liquid crystal polymers or the like. These polychromic multi-layered particles depending on viewing angle show the polychromic effect depending on viewing angle by the interference color generated by the interference of the light and so called rainbow-colored pigments are included therein.

As for polychromic particles depending on viewing angle of the present invention, those particles with optical reflection layer(s) are preferably used. Optical reflection layer(s) can be either inner layers or outer layers of the particles. In addition, optical reflection layer(s) can be either base layer (s) or coating layers of the particles. In addition, optical reflection layers may be constructed with other materials than the said particles as optical reflection bodies. In addition, for example, particles with the reflectance of not less than 0.3, or not less than 0.4, or preferably not less than 0.5 are advantageously used for optical reflection layer(s). Further, in the polychromic particles depending on viewing angle of the present invention, flaky and smooth polychromic particles depending on viewing angle having optical specular reflection layers can preferably be used. For example, such particles comprise smooth and flaky multi-layered particles comprising base layer(s) with optical specular reflection layer(s) and coating layers which interfere light, wherein the said base layer(s) comprise metallic films reflecting specularly and the said coating layers comprise at least two species of metals or metallic compound films whose refractive index is different.

In the case of these particles, when some parts of the incident light coming into the particle surface are reflected on the surface of the coating layers, and other parts of the incident light are refracted, reflected, and transmitted in the coating layers, and when these lights are synthesized with the light which is reflected on the surface or in the said coating layers and interferes each other as a light with specific wave length, interference color depending on viewing angle is provided as an interference light with specific wave length coming out from inside of the said particles to outside of the particles. The base layer(s) of the said metallic film(s) are not specifically limited, but it is preferable to use the metallic simple substance or metallic alloy whose reflectance is not less than 0.5. The examples include silver (reflectance; 0.94), aluminum (reflectance; 0.83), gold (reflectance; 0.80), nickel (reflectance; 0.63), or the like. In addition, base layer(s) are not limited to metallic films and iron oxide $Fe_2O_3$ can be used. Further, coating films are not specifically limited and the multi-layered translucent metals or metallic compounds (including metal oxides) with high refractive index and transparent metals or metallic compounds (including metal oxides) with low refractive index can alternately be used.

As for the preferable combinations of the base layer(s) and the coating layers for these particles, it is preferable that the said base layer(s) comprise aluminum films and that the said coating layers comprise magnesium fluoride films at the side of the base layer(s) and chrome films at the opposite side of the base layer(s). To cite an example, magnesium fluoride and chrome coated aluminum disclosed by "Roger W. Phillips et al. U.S. Pat. No. 5,653,792 (1997), Flex Products, INC." can be used. For example, the trade name "CHROMAFLAIR" manufactured by Flex Products, INC. can be cited.

As for the preferable combinations of the base layer(s) and the coating layers for these particles, it is preferable that polychromic particles depending on viewing angle comprise silicone (compounds), iron (compounds), and aluminum (compounds). For example, such particles are preferable that the said base layer(s) comprise aluminum film(s), and the said coating layers comprise $SiO_2$ films at the side of the base layer(s) and $Fe_2O_3$ films at the opposite side of the base layer(s).

In addition, the preferred embodiment is constructed that $Fe_2O_3$ is used as the said base layer(s) around which dual-layered metallic film of $SiO_2$ and $Fe_2O_3$ is coated. For example, as base layer(s), aluminum or MIO (mica-like $Fe_2O_3$), and as coating layers, as multi-layered pigment particles with the order of $SiO_2$ and $Fe2O_3$, trade names "Variochrom Magic Red L4420", "Variochrom Magic Purple L5520", or "Variochrom Magic Gold L1400", manufactured by BASF Aktiengesellschaf can be cited. In addition, particles consisting of aluminum-manganese as coating layers and particles consisting of mica-like $Fe_2O_3$ as base layer(s) can be used. For example, trade names "Paliochrom Copper L 3000" and "Paliochrom Copper L3001" can be cited. In addition, as base layer(s), $SiO_2$, and as multi-layered particles with the order of tin oxide and titanium oxide, or iron oxide, "Color Stream T20-01W2" and "Color Stream F20-00W2" manufactured by Merck Japan Ltd., can be cited.

Further, as polychromic particles depending on viewing angle, cholesteric liquid crystal polymer can preferably be used. "Cholesteric liquid crystal polymer" referred to in the present invention is a glittering material defined as a particle of cholesteric liquid crystal polymer having a spiral structure and is a leafy typed particle. For example, such leafy-typed particles can be used that have optical reflection layers wherein plural of the layers of cholesteric liquid crystal polymer particles are orientated optically in one direction to arrange the orientating direction of the said polymer particles to be constructed in storied manner. As a result, depending on the degree of the overlapping of spiral polymer particles orientated optically, spectral components of only some wave length domains are reflected, transmitting all the other wave length of the domains among the incident light on this particle surface in the broad spectral domains. The domain of reflected spectral components is decided by the pitch of the optical reflection layers when the orientation of the polymer particles rotates once (one cycle) and by the refraction index by the materials. Reflected spectral domain is divided into left spirally polarized light and right spirally polarized light. At this stage, since one is reflected and the other transmitted depending on the rotating direction of spirals, this cholesteric liquid crystal polymer has permeability over the whole domains of the spectrals. By using this liquid crystal polymer, written marks or coating films with polychromic depending on viewing angle can be obtained, which is the object of the present invention. In addition, cholesteric liquid crystal polymer particles are more excellent in dispersibility compared with conventional aluminum pigments, pearlescent pigments, the above mentioned polychromic particles depending on viewing angle, or the like in case of its light specific gravity. Further, in case of low viscosity, cholesteric liquid crystal polymer particles are less likely to settle. Besides, since these cholesteric liquid crystal polymer particles have high transparency, new color effect can be obtained without any impurities of colors by combining two or more species of cholesteric liquid crystal polymer particles. Further, it is possible to change color tones depending on substrate colors or by blending other colorants. Examples of cholesteric liquid crystal polymer used in the present invention include "HELICONE 450", "HELICONE 516", "HELICONE 575", "HELICONE 624", and "HELICONE HC", manufactured by Wacker-Chemie GmbH in Germany.

In the polychromic particles depending on viewing angle used in the present invention, each particle cited above can be used alone. However, two or more of the species can be used in combinations. In addition, by combining polychromic particles (pigments) depending on viewing angle with high opacifying power and dye or pigments, inks with various color tones can be adjusted, and there is also an effect that the amount of the expensive polychromic particle pigments depending on viewing angle to be used can be reduced.

It is preferable that the median diameter of polychromic particles depending on viewing angle used in the present invention is 1.0 to 100 $\mu$m. When the median diameter of flaky pigments is less than 1.0 $\mu$m, particles are so small that they are poor in color development. On the other hand, when the median diameter exceeds 200 $\mu$m, it is not preferable since it is difficult to come out of a pen tip when used as an ink for writing instruments or coated materials, including ball-point pens, wherein the particles have to pass through the narrow tube. In order to prepare an ink realizing good color development and preferably used for writing instruments or coated materials, including ball-point pens, wherein the particles have to pass through the narrow tube, it is preferable that the maximum diameter of the said particles is 1.0 to 200 $\mu$m, most suitably, 10 to 100 $\mu$m.

Here, when the ink composition of the present invention is used for a stamping ink, it is preferable that the average particle diameter of polychromic pigments depending on viewing angle is not greater than 500.0 $\mu$m. When the average particle diameter of polychromic pigments depending on viewing angle exceeds 500.0 $\mu$m, it is not preferable since it is difficult to come out of a sponge when used as a stamping ink wherein the particles have to pass through the narrow pores of the sponge. The average particle diameter of polychromic pigments depending on viewing angle further preferable as a stamping ink is 1.0 to 110.0 $\mu$m.

The content of polychromic particles depending on viewing angle used in the present invention is preferably 0.5 to 40.0% by weight with respect to the total amount of the ink composition. When the content of polychromic particles depending on viewing angle is less than 0.5% by weight with respect to the total amount of the ink composition, the color development on a white substrate and polychromic depending on viewing angle are not enough. On the other hand, when the content of polychromic particles depending on viewing angle exceeds 40.0% by weight with respect to the total amount of the ink composition, the viscosity becomes so high that the fluidity deteriorates and the writing characteristics becomes poor. The optimal amount of polychromic particles depending on viewing angle to be compounded is 3.0 to 20.0% by weight with respect to the total amount of the ink composition.

Here, when the ink composition of the present invention is used as a stamping ink, the content of polychromic particles depending on viewing angle is preferably 3.0 to 40.0% by weight with respect to the total amount of the ink composition. When the content of polychromic particles depending on viewing angle is less than 3.0% by weight with respect to the total amount of the ink composition, the color development on the white substrate and polychromic depending on viewing angle are not enough. On the other hand, when the content of polychromic particles depending on viewing angle exceeds 40.0% by weight with respect to the total amount of the ink composition, the viscosity becomes so high that the fluidity deteriorates and it gets difficult to stamp on. The optimal amount of polychromic particles depending on viewing angle used as a stamping ink composition to be compounded is 5.0 to 30.0% by weight with respect to the total amount of the ink composition.

It is preferable that the polychromic particles depending on viewing angle used in the present invention have the form of flaky type (plate type). By using flaky typed particles, it is easy to coat the written surface or coated surface, the interference color of polychromic depending on viewing angle strongly appears, and the interference color of polychromic depending on viewing angle can be given uniformly to the written surface or coated surface.

Colorants

Colorants are not necessarily contained in the present invention. However, when more color variation is desired, colorants can further be used.

It is preferable that such colorants have solubility and dispersibility. For example, dyes and/or pigments can preferably be used.

It is preferable that dyes are selected depending on the solvents and have great solubility in the solvents. To be specific, when the solvents is water, water-soluble dyes such as acid dyes, direct dyes and basic dyes can be used. And when the solvent is an organic solvent, oil-soluble dyes can be used. It is preferable that the pigments have great dispersibility in the solvents. For example, inorganic pigments, organic pigments, resin pigments, fluorescent pigments, metal pigments, glittering pigments, colored emulsion, or the like can be used. Further, they can be used alone or in combinations of two or more of them.

Here, in the ink composition of the present invention, when the opacifying power (reflectance) is not enough, it is preferable to mix the colorant (coloring matter) getting into the side of a substrate of the polychromic particles depending on viewing angle as an optical absorbent which absorbs the light permeating through the polychromic particles depending on viewing angle. For example, in the case of pigments, the hue of the pigments is preferably deep, and inorganic and organic pigments such as carbon black, $Fe_2O_3$, dioxazine, phthalocyanine, indanthrene, quinacridon, anthraquinone, or the like can be used alone or in combinations. When a liquid crystal polymer, in particular, the said cholesteric liquid crystal polymer is used as a polychromic particle depending on viewing angle, it is preferable to use pigments (coloring matters) as the said optical absorbents, among which it is particularly preferable to use black colors, dark colors, very dark colors, dark graysh colors, and deep colors of pigments or mixed colors of pigments with the brightness value of not greater than 4 provided in the "Names of Non-Luminous Object Colours" by JIS Z 8102 (1985).

In addition, in order to deepen the color of a substrate of the polychromic particles depending on viewing angle, the size of this pigment is required to be smaller enough than the thickness of the polychromic particles depending on viewing angle. As for the size of the said pigment, it is preferable that the average particle diameter is 0.01 to 0.5 μm when measured by a measuring device of a centrifugal sedimentation type for particle size distribution of transmitted light (under the trade name of CAPA-7000 manufactured by Horiba Seisakusho, for example). When the average particle diameter is less than 0.01 μm, although it is not possible to be measured by the said measuring device, in theory, the transparency of the pigments increases, which leads to some disadvantage in that the great amount of additional pigments is to be required for the purpose of deepening the color of a substrate of the polychromic particles depending on viewing angle. When the maximum particle diameter of the flaky polychromic particles depending on viewing angle is less than 10 μm, the thickness of the polychromic particles depending on viewing angle as written marks or coating films becomes around 0.5 μm. Therefore, pigment particles whose average particle diameter is over 0.5 μm inhibit the light reflection on the surface of polychromic particles depending on viewing angle or opacify the polychromic particle surface depending on viewing angle and the polychromic effect depending on viewing angle which is the purpose of this invention is poorly observed. The optimal average particle diameter of the pigments (optical absorbents) measured by the said measuring device of the particle size distribution is 0.03 to 0.3 μm.

When the ink composition of the present invention is used as a stamping ink, as for the size of this pigment (optical absorbent), it is preferable that the average particle diameter is 0.08 to 0.4 μm when measured by a measuring device of a centrifugal sedimentation type for particle size distribution of transmitted light (under the trade name of CAPA-7000 manufactured by Horiba Seisakusho, for example). When the average particle diameter of the pigments is less than 0.08 μm, in theory, the transparency of the pigments increases, which leads to some disadvantage in that the great amount of additional pigments is to be required for the purpose of obtaining the optional coloring effect. When the maximum particle diameter of the pigments exceeds 0.4 μm, the light reflection on the surface of polychromic particles depending on viewing angle is inhibited or the polychromic particle surface depending on viewing angle is opacified, and the polychromic effect depending on viewing angle which is the purpose of this invention is poorly observed.

In addition, when dyes are used as optical absorbents, it is preferable that the hues of the dyes are also deep colored. The examples include acid dyes such as C.I. Acid Black 2, C.I. Acid Violet 49, C.I. Acid Blue 83, C.I. Acid Red 52, C.I. Acid Green 25, or the like, direct dyes such as C.I. Direct Black 51, C.I. Direct Violet 12, C.I. Direct Blue 71, C.I. Direct Red 62, C.I. Direct Green 6, or the like, basic dyes such as C.I. Basic Black 1, C.I. Basic Violet 1, C.I. Basic Blue 3, C.I. Basic Red 1, C.I. Basic Green 2, or the like, and oil-soluble dyes such as C.I. Solvent Black 23, C.I. Solvent Violet 8, C.I. Solvent Blue 2, C.I. Solvent Red 49, C.I. Solvent Green 3, or the like. Other preferable examples include C.I. Disperse Black 10, or the like. Further, these dyes can be used alone or in combinations of two or more of them.

When the liquid crystal polymers, in particular, the said cholesteric liquid crystal polymers are used as polychromic particles depending on viewing angle, it is preferable to use dyes (coloring matters) as the said optical absorbents, among which it is particularly preferable to use black colors, dark colors, very dark colors, dark graysh colors, and deep colors which are pigments or mixed colors of pigments with the brightness value of not greater than 4 provided in the "Names of Non-Luminous Object Colours" by JIS Z 8102 (1985).

Here, in order to deepen the color of the substrate as described above, the colorants including pigments, dyes, or the like, as the said optical absorbents are preferably contained in 0.05 to 20.0% by weight with respect to the total-amount of the ink composition. When the content of the said colorants is less than 0.05% by weight, the deepening of the color of a substrate is not enough and the color development of written marks or coating films, or polychromic depending on viewing angle is hard to be observed. When the content of the said colorants exceeds 20.0% with respect to the total amount of the ink composition, the viscosity becomes so high as an ink that the fluidity lowers and the writing characteristics or coating characteristics deteriorates. The optimal amount of the colorants to be contained is 0.5 to 10.0% by weight, and in particular, 1.0 to 10.0% by weight with respect to the total amount of the ink composition although the said amount varies depending on the types of colorants. In addition, these colorants can be used either alone or in combinations of two or more of them.

When the ink composition of the present invention is used as a stamping ink, it is preferable that the content of the colorants is not greater than 10.0% with respect to the total amount of the ink composition. When the content of the colorants exceeds 10.0% by weight with respect to the total amount of the ink composition, in a stamping ink, the said colorants inhibit the light reflection on the surface of polychromic particles depending on viewing angle or opacify the surface of polychromic particles depending on viewing angle and the effect of interference color of the polychroism depending on viewing angle, which is the purpose of the present invention, is hard to be observed. The optimal amount of polychromic pigments depending on viewing angle as stamping inks to be contained is less than 5.0% by weight with respect to the total amount of the ink composition.

Thus, in the ink composition of the present invention, by preferably mixing deep colored coloring matters (transmitted light absorbents) whose size is smaller enough than the thickness of polychromic particles depending on viewing angle, and by coloring a substrate coated with polychromic coloring matters depending on viewing angle with the said deep-colored coloring matters (transmitted light absorbents), or by penetrating the said deep-colored coloring matters into the substrate, strong polychroism depending on viewing angle on the white colored substrate can be developed even when the polychromic particles depending on viewing angle with lower opacifying characteristics are used. Therefore, as described above, in the case of cholestric liquid crystal polymer particles, in order to obtain written marks or coating films with polychroism depending on viewing angle on the white colored substrate, it is preferable to prepare the ink composition which contains transmitted light absorbents which absorb light transmitted through these particles and reflecting on the substrate. Here, the permeating light absorbents used in the present invention are not limited to the colorants (coloring matters) including the said pigments or dyes. They can be used as long as the absorbents can absorb the transmitted light through the polychromic particles depending on viewing angle with low opacifying capacity.

Binder Resins

In the present invention, binder resins can be used for the purpose of fixing polychromic particles depending on viewing angle, particularly flaky polychromic particles depending on viewing angle to the coated material (substrate). The binder resins of the present invention can be used appropriately selected among the resin components that are incorporated in the solvents. As binder resins when water is used as a solvent, a water-soluble paste is preferably used. The examples include such as Arabic gum, dextrin derivatives, cellulose derivatives such as carboxymethyl cellulose or the like, polyvinyl alcohols, polyvinyl pyrrolidones, polyacrylic acids, acrylic acid type copolymers, the monomers having water soluble functional group or maleic anhydride, and the like. The said water-soluble natural or synthetic resin can preferably be used. In addition, pastes of emulsion or dispersion types that are not water-soluble, unlike the said resins, but can be incorporated in the dispersed state can preferably be used for the purpose of fixing flaky pigments to the substrate.

As for binder resins, when organic solvents are used as solvents, oil-soluble resin can preferably be used. The examples include petroleum hydrocarbon resins of aliphatics, alicyclics, and aromatics, vinyl resins including styrene type, acrylic ester type, vinyl acetate type, terpene type, or the like, polyvinyl acetal resins including polyvinyl butyral, or the like, formalin condensation resins or modified resins thereof of phenol type, xylene type, acryl ester type, vinyl acetate type, terpene type, or the like, others including polyamide resins, ketone resins, rosin or the modified resins thereof. These synthetic, semisynthetic, or natural oil-soluble resins can be appropriately selected and used depending on the types of organic solvents.

The content of the binder resins to be compounded is preferably 1.0 to 30.0% by weight with respect to the total amount of the ink composition. When the content of the said binder resin is less than 1.0% by weight with respect to the total amount of the ink composition, the fixability of the polychromic particles depending on viewing angle to the substrate is not enough. On the other hand, when the content of the said binder resins exceeds 30.0% by weight with respect to the total amount of the ink composition, the viscosity becomes so high for an ink that the fluidity lowers and writing characteristics deteriorates. The optimal content of the binder resins to be compounded is 5.0 to 20.0% by weight. In addition, the said binder resins can be used alone or mixed in combinations of two or more of them.

Solvents

Solvents can be used in the present invention. Solvents can be selected by the purpose, depending on the case where water is used as a main solvent and where an organic solvent is used as a main solvent with water not substantially contained.

Water is used as a main solvent for the purpose of giving late drying to an ink composition and preventing from drying at the pen tip or the like which contains the ink. Water-soluble organic solvents can be added in order to lower the speed of drying at the pen tip. The examples include glycols such as ethylene glycol, diethylene glycol, triethylene glycol, propylene glycol and polyethylene glycol, polyhydric alcohols such as glycerin, glycol ethers such as ethylene glycol monomethyl ether, diethylene glycol monomethyl ether, dipropylene glycol monomethyl ether and dipropylene glycol monopropyl ether, or the like. These organic solvents can be used alone or in combinations of two or more of them.

When an organic solvent is used as a main solvent, it is used for both purposes of letting the ink dry quickly and hard to vaporize. It is easy to prepare the bar typed solid ink by gelling. The organic solvent can be selected either alone or in combinations of two or more of them depending on the characteristics required for the ink including quick-drying or late-drying, or the like.

The examples of the organic solvent include aromatic hydrocarbons including toluene, xylene, or the like, alicyclic hydrocarbons including methylcyclohexane, or the like, aliphatic hydrocarbons, alcohols including ethyl alcohol, isopropyl alcohol, benzyl alcohol, or the like, ketones including methyl ethyl ketone, methyl isobutyl ketone, isophorone, or the like, esters including ethyl acetate, butyl acetate, or the like, ether alcohols including cellosolve, butyl cellosolve, propylene glycol, monometyl ether, or the like.

Shear-thinning Property Imparting Agents

In the ink composition of the present invention, it is important to contain shear-thinning property imparting agents together with the said solvent in order to adjust the viscosity of an ink, maintain dispersal stability of polychromic particles depending on viewing angle, realize the good interference color uniformly, and be preferably used for writing instruments including ball-point pens as an ink with excellent maintenance stability.

In particular, when polychromic particles depending on viewing angle are constructed that metal and/or metal oxide are multi-layered as described above, since the multi-layered particles containing several metallic components have much larger specific gravity, compared with the ordinary pigment particles and the single metallic powder pigment particles, the multi-layered particles are liable to settle.

In addition, when polychromic particles depending on viewing angle are, for example, the said cholesteric liquid crystal polymers, since they are constructed by liquid crystal structure body of polymers, the specific gravity is small, while the particle diameter is larger compared with the pigments used for ordinary felt-tip pens or ball-point pens. Therefore, they are liable to settle without shear-thinning property imparting agents. Therefore, in the present invention, it is very important to attempt dispersal stability and prevention of sedimentation of the ink which contains these polychromic particles depending on viewing angle and to compound shear-thinning property imparting agents is very effective.

From the view point described above, it is effective to use saccharides when water is used as a solvent. "Saccharides" in the present invention are defined as a generic term of monosaccharides, oligosaccharides, and polysaccharides, but it is preferable to use compounds classified as polysaccharides for the said purpose. To cite examples, microbeal polysaccharides and derivatives thereof are used. For example, pullulan, xanthane gum, welan gum, rhamsan gum, succinoglucan and dextran, or the like, can be cited. In addition, water-soluble polysaccharides derived from plants and derivatives thereof are used. For example, tragacanth gum, guar gum, tara gum, locust bean gum, ghatti gum, arabinogalactan gum, gum arabic, quince seed gum, pectin, starch, psyllium seed gum, pectin, carrageenan, alginic acid, agar or the like, can be cited. Further, water-soluble polysaccharides derived from animals and derivatives thereof are used. For example, gelatin, casein and albumin can be cited. These polysaccharides are the materials with the property of decomposing into monosaccharides including glucose, mannose, or the like, which are composing units of the polysaccharides.

When water is used in the present invention, microbeal polysaccharides and derivatives thereof are particularly used among the said saccharides. In particular, even when the polychromic particles depending on viewing angle are multi-layered particles containing several metallic components or the said cholesteric liquid crystal polymers with a large particle diameter, microbeal polysaccharides and derivatives thereof selected from pullulan, xanthane gum, welan gum, rhamsan gum, succinoglucan and dextran are excellent in pseudo-plasticity fluidity, are good in the effect of preventing the sedimentation of the polychromic particles depending on viewing angle, and are excellent in maintenance stability of the ink. Especially, the pseudo-plasticity fluidity to the flaky and smooth polychromic particles depending on viewing angle is excellent. Therefore, when applied for writing instruments including ball-point pens or the like, the said particles flow out of the tip end uniformly and preferably stabilized at the time of writing, and flaky and smooth polychromic particles depending on viewing angle are liable to arrange themselves horizontally on the written marks or coating films thereby developing strong interference light (interference color) on the written marks or coating films easily. Here, the said saccharides can be used alone or in combinations of two or more of them.

The content of saccharides is preferably 0.01 to 5.0% by weight with respect to the total amount of the ink composition. When the content of the said saccharides is less than 0.01% by weight with respect to the total amount of the ink composition, satisfactory polychroism depending on viewing angle is hard to be shown since the effect of preventing sedimentation of polychromic particles depending on viewing angle is not enough. On the other hand, when the content of saccharides exceeds 5.0% by weight with respect to the total amount of the ink composition, the viscosity becomes so high that the fluidity deteriorates and it becomes hard to write or coat. In addition, due to the required viscosity modification, it becomes necessary to make the compounding amount of the polychromic particles depending on viewing angle less than 0.5% by weight, which makes the color development on a white-colored substrate and the polychroism depending on viewing angle unsatisfactory. The optimal amount of saccharides to be compounded is 0.05 to 3.0% by weight although it depends on the types of saccharides.

When organic solvents are used as solvents, it is preferable to use non-pigment type gelling agents as shear-thinning property imparting agents. The pigment typed gelling agents which can be used in the organic solvent are particles of bentonite or fine particle silica. However, since they are particles, they affect deflection, therefore affect polychroism depending on viewing angle badly, and are not preferable. The non-pigment typed gelling agents referred to in the present invention are defined as a generic term for materials not classified as pigments, extender pigments, or the like. Some non-pigment type gelling agents are soluble in the solvent, however, since they are mainly dissolved in the solvent, they can preferably be used since they do not badly affect as shown by the pigment typed gelling agents. The examples of non-pigment typed gelling agents include metallic soaps such as 2-ethylhexaoic acid aluminum or the like, sorbitol derivatives such as dibenzyliden sorbitol or the like, alkyl amides such as alkyl glutamic acid alkyl amide or the like, aliphatic acid amides, polyethylene oxide waxes, dextrin fatty acid esters, hydrogenated castor oil, 12-hydrixystearic acid, polyether ester surfactant typed gelling agent, or the like and they can appropriately be used depending on the types of organic solvents.

The content of non-pigment typed gelling agents is preferably 0.01 to 20.0% by weight with respect to the total amount of the ink composition. When the content of non-pigment typed gelling agent is less than 0.01% by weight with respect to the total amount of the ink composition, the effect of preventing the sedimentation of the polychromic particles depending on viewing angle is not enough. When the content of non-pigment typed gelling agents exceeds 20.0% by weight with respect to the total amount of the ink composition, the viscosity becomes so high for an ink that the fluidity deteriorates. The optimal amount of non-pigment typed gelling agent to be compounded is 0.2 to 10.0% by weight although it depends on the types of the non-pigment typed gelling agents to some extent. In addition, the said non-pigment typed gelling agent can be used alone or in combinations of two or more of them.

As a particularly preferable embodiment when organic solvents are used as solvents in the present invention, the metallic soaps, among the non-pigment typed gelling agents, are used. By using the said metallic soaps, quick-drying polychromic ink depending on viewing angle without sedimentation of polychromic particles depending on viewing angle can be obtained.

Viscosity Range

The preferable range of viscosity of the ink composition of the present invention is 500 to 10,000 mPa·s. Here, the viscosity is the measured value by an ELD-typed viscometer (3° R 14 cone, rotation speed; 0.5 rpm, at the temperature of 20° C.).

Surfactant, Penetrating-thickening Agent

In the present invention, to add various types of surfactants is effective to for the purpose of forming coating films or written marks of the flaky polychromic particles depending on viewing angle which are orientated along the substrate, and for the purpose of letting dyes and pigments get into the side of the substrate of the coating films or written marks. It is particularly effective when a substrate has penetrability like paper. As for surfactants, such surfactants selected from nonionic type, anionic type, cationic type, betaine type, silicone type, fluorine type surfactants are used alone or in combinations of two or more of them.

In particular, a stamping ink comprising polychromic particles depending on viewing angle preferably contains a penetrating-thickening agent. It is important that components capable of attaining dispersion of the polychromic particles depending on viewing angle and prevention of the sedimentation of the polychromic particles depending on viewing angle are used for a penetrating-thickening agent. As for a penetrating-thickening agent capable of carrying out the present invention, nonionic surfactants can be cited. For example, polyglycerin fatty acid ester, sorbitan fatty acid ester, or the like can be cited. In particular, polyglycerin fatty acid ester can preferably be used. In addition, the said nonionic surfactants can be used alone or in combinations of two or more of them.

The content of these penetrating-thickening agents is preferably 10.0 to 60.0% by weight with respect to the total amount of the ink composition. When the content of penetrating-thickening agents is less than 10.0% by weight with respect to the total amount of the ink composition, the effect of preventing sedimentation of the polychromic particles depending on viewing angle is unsatisfactory and penetrability into the paper is not satisfactory, either. On the other hand, when the content of polychromic particles depending on viewing angle exceeds 60.0% by weight with respect to the total amount of the ink composition, the viscosity becomes so high that the fluidity deteriorates and it becomes difficult to stamp on or write on. The optimal amount of penetrating-thickening agents to be compounded is 20.0 to 40.0% by weight.

Other Additives

Here, in the present invention, other additives can be added as required, including lubricants such as polyoxyethylene alkaline metal salt, dicarboxylic acid amide, phosphate ester, N-oleyl sarcosine salt, or the like, rust inhibitors such as benzotriazol, tolyltriazole dicyclohexyl ammonium nitrite, or the like, antiseptic mildew agents such as benzoisothiazorin type, pentachlorophenol type, cresol, or the like.

Mode of Use of the Ink Composition

The mode of use of the present invention is not specifically limited, but the examples of the preferable mode of use include: the mode of containing an ink composition in a bottle shaped container like a manicure container and coating with a brush, or the like; the mode of containing an ink composition in a tube made of metal, resin, or the like, and using only the necessary amount by pressing it out; the mode of impregnating an ink composition with an ink absorbing body including sponges, or the like, in a cylindrical container, stamping directly using the said ink absorbing body and coating the ink; and the mode of setting the material for coating including a ball-point pen tip, or the like at one end of an ink container, and coating an ink with the pen tip.

As a particularly preferred mode, the ink is used for the so-called aqueous gelling ink ball-point pens. The inventors or the applicant filed the application of the invention related to writing instruments preferable in using the flaky pigment particles and the mode of ball-point pen tips as well (Japanese application number 11-258189, Japanese application number 11-265232, Japanese application number 11-265233, and Japanese application number 2000-30124). The employment of these modes is the most suitable in obtaining the written marks of the ink composition of the present invention by using ball-point pens.

Transparent Container

In addition, in any mode of use, to use a transparent or translucent material for an ink container can obtain the effect that the container itself seems to have polychromic depending on viewing angle since the color of the ink container itself can be perceived differently depending on viewing angle as well as the residual of the ink can be visually observed. Further, by using this mode, good designs and novel designs can be realized.

EXAMPLE

The ink composition was obtained by mixing and stirring ingredients in the compositions and amounts (parts by weight) given in Tables 1 and 2 to disperse them, thereafter filtering the resulting mixture, and subsequently degassing. In every preparation, heretofore known dispersing, degassing, filtering techniques and the like were used.

TABLE 1

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Polychromic particles depending on viewing | I | 6.0 | 13.5 | 15.0 | | | | | | | | | | | |
| | II | | | | 10.0 | 10.0 | 10.0 | 10.0 | | | | | | | |
| | III | | | | | | | | 6.0 | 10.0 | 15.0 | | | | |
| | IV | | | | | | | | | | | 10.0 | | | |
| | V | | | | | | | | | | | | 10.0 | 10.0 | |
| | VI | | | | | | | | | | | | | | 10.0 |
| Pearlescent pigment | I | | | | | | | | | | | | | | |
| | II | | | | | | | | | | | | | | |
| Metallic powder pigment | I | | | | | | | | | | | | | | |
| | II | | | | | | | | | | | | | | |
| Shear-thinning property imparting agent | I | 0.3 | | | 0.3 | | | | | | | 0.3 | | | |
| | II | | 0.3 | | | 0.3 | 0.3 | | | | | | 0.3 | 0.3 | |
| | III | | | | | | | | 0.4 | 0.3 | | | | | |
| | IV | | | 2.5 | | | | 2.5 | | | 2.5 | | | | 2.5 |
| Binder component | I | 1.5 | | | 1.5 | | | | 1.5 | | | 1.5 | | | |
| | II | | 9.5 | | | 9.5 | 9.5 | | | 9.5 | | | 9.5 | 9.5 | |
| | III | | 0.2 | | | 0.2 | 0.2 | | | 0.2 | | | 0.2 | 0.2 | |
| | IV | | | 6.0 | | | | 6.0 | | | 6.0 | | | | 6.0 |
| Antiseptic mildew proofing agent | I | 0.1 | 0.1 | | 0.1 | 0.1 | 0.1 | | 0.4 | 0.1 | | 0.1 | 0.1 | 0.1 | |
| Rust-inhibitor | I | 0.1 | 0.1 | | 0.1 | 0.1 | 0.1 | | 0.8 | 0.1 | | 0.1 | 0.1 | 0.1 | |
| Lubricant | I | 1.2 | 1.2 | | 1.2 | 1.2 | 1.2 | | | 1.2 | | 1.2 | 1.2 | 1.2 | |
| | II | | | | | | | | 1.0 | | | | | | |
| Surfactant/Penetrating, thickening agent | I | | | 1.5 | | | | 1.5 | | | 1.5 | | | | 1.5 |
| | II | | | | | | | | | | | | | | |
| Wetting agent | I | | | | | | | | | | | | | | |
| Colorant | I | 1.0 | | | | | | | | | | | | | |
| | II | | | | | | | | | | | | | | |
| | III | | | | 10.0 | 10.0 | | | | | | 20.0 | 5.0 | | |
| | IV | | | | | | | | | | | | 15.0 | | |
| | V | | | | | | | | | | | | | | |
| | VI | | | | | | 10.0 | | | | | | | 20.0 | |
| | VII | | | | | | | 2.0 | | | | | | | 2.0 |
| | VIII | | | | | | | | | 2.0 | | | | | |
| Water-soluble organic solvent | I | 5.0 | 5.0 | | 5.0 | 5.0 | 5.0 | | 5.0 | 5.0 | | 5.0 | 5.0 | 5.0 | |
| Water | | 84.8 | 70.1 | | 71.8 | 63.6 | 63.6 | | 84.9 | 71.6 | | 61.8 | 53.6 | 53.6 | |
| Organic solvent | I | | | 9.0 | | | | 9.0 | | | 9.0 | | | | 9.0 |
| | II | | | 66.0 | | | | 69.0 | | | 66.0 | | | | 69.0 |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2

| | | Comparative Example | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Polychromic particles depending on viewing angle | I | | | | | | | | | | | | | | | | | 13.5 | 15.0 | | | | |
| | II | | 15.0 | | | | | | | | | | | | | | | | | 10.0 | 10.0 | | |
| | III | | | 13.5 | | | | | | | | | | | | | | | | | | | |
| | IV | | | | 15.0 | | | | | | | | | | 10.0 | | | | | | | | |
| | V | | | | | | | | | | | | | | | | | | | | | 6.0 | |
| | VI | | | | | | | | | | | | | | | | | | | | | | 15.0 |
| Pearlescent pigment | I | | | | | | 10.0 | 10.0 | 10.0 | 10.0 | 6.0 | 15.0 | 6.0 | 15.0 | | | | | | | | | |
| | II | | | | | 10.0 | | | | | | | | | | 10.0 | 10.0 | | | | | | |
| Metallic powder pigment | I | | | | | | | | | | | | | | | | | | | | | | |
| | II | 0.3 | | | | | | | | | | | | | | | | | | | | | |
| Shear-thinning property imparting agent | I | | | | | 0.3 | 0.3 | | | | | | | | 0.3 | | | | | | | | |
| | II | | | | | | | 2.5 | | | | 2.5 | | | | | | | | | | | |
| | III | | | | | | | | | | 0.4 | | | | | | | | | | | | |
| | IV | | 2.5 | | | | | | | | | | | | | 0.3 | 0.3 | | | | | | |
| Binder component | I | | | | 1.5 | 1.5 | | 1.5 | | 1.5 | 1.5 | | 1.5 | 1.5 | 1.5 | | | | 1.5 | | 1.5 | 1.5 | 1.5 |
| | II | 9.5 | | 9.5 | | | 9.5 | | 9.5 | | | | | | | 9.5 | 9.5 | 9.5 | | 9.5 | | | |
| | III | 0.2 | | 0.2 | | | 0.2 | | 0.2 | | | | | | | 0.2 | 0.2 | 0.2 | | 0.2 | | | |
| | IV | | 6.0 | | 6.0 | | | 6.0 | | 6.0 | | 6.0 | | 6.0 | | | | | 6.0 | | 6.0 | | 6.0 |
| Antiseptic/mildew proofing agent | I | 0.1 | | 0.1 | | 0.1 | 0.1 | | 0.1 | | 0.4 | | 0.4 | | 0.1 | 0.1 | 0.1 | 0.1 | | 0.1 | | 0.4 | |
| Rust inhibitor | I | 0.1 | | 0.1 | | 0.1 | 0.1 | | 0.1 | | 0.8 | | 0.8 | | 0.1 | 0.1 | 0.1 | 0.1 | | 0.1 | | 0.8 | |
| Lubricant | I | | | | | | | | | | 1.0 | | 1.0 | | | | | | | | | 1.0 | |
| | II | 1.2 | | 1.2 | | 1.2 | 1.2 | | 1.2 | | | | | | 1.2 | 1.2 | 1.2 | 1.2 | | 1.2 | | | |
| Surfactant/Penetrating, thickening agent | I | | | | | | | | | | | | | | | | | | | | | | |
| | II | | | | | | | | | | | | | | | | | | | | | | |
| | III | | | | | | | | | | | | | | | 2.0 | | | | | | | |
| | IV | | | | | | | | | | | | | | | | | | | | | | |
| Wetting agent | V | | | | | | | | | | | | | | | | | | | | | | |
| | VI | | | | | | | | | | | | | | | | | | | 10.0 | | | |
| Colorant | VII | | | | | | | | | | | | | | | | | | | | 2.0 | | |
| | VIII | | | | | | | | | | | | | | | | | | | | | | |
| Water-soluble organic solvent | I | 5.0 | | 5.0 | | 5.0 | 5.0 | | 5.0 | | 5.0 | | 5.0 | | 5.0 | 5.0 | 5.0 | 5.0 | | 5.0 | | 5.0 | |
| Water | | 70.1 | | 70.4 | | 81.8 | 73.6 | 71.0 | 73.9 | 73.5 | 84.9 | 66.0 | 85.3 | | 81.8 | 71.6 | 73.6 | 70.4 | | 63.9 | 71.5 | 85.3 | |
| Organic solvent | I | 9.0 | 9.0 | | 9.0 | | | 9.0 | | 9.0 | | 9.0 | | 9.0 | | | | | 9.0 | | 9.0 | | 9.0 |
| | II | | 66.0 | | 68.5 | | | | | | | | | 68.5 | | | | | 68.5 | | | | 68.5 |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

In Tables, each raw material composition is as follows:
Polychromic Particles Depending on Viewing Angle I. Pigment particles prepared by the following preparation method;

Trade name "Miracle Color Ink Conk 653 green/purple" manufactured by Seiko Advance Co., was left to stand for several days and flaky pigments precipitated at the bottom of the container were gathered. The gathered precipitation was diluted with cyclohexane, thereafter filtered. At the last stage of repeating the said operation three times, the filtered substance obtained was dried for five hours with the oven at the temperature of 80° C., thereby obtaining dried powdery substance. When the metallic component was measured by using "SEA-2010" fluorescent X-ray analyzer manufactured by Seiko Instruments Inc., it was a polychromic particle (pigment particle) depending on viewing angle containing 66.6% of magnesium, 23.6% of chrome, and 9.3% of aluminum (rate of strength). In addition, when the form was confirmed by using "ERA-8000", an electron-microscope manufactured by ELIONIX INC., by enlarging the said polychromic particle depending on viewing angle obtained by the above process 250 to 1000 times, it was a smooth multi-layered particle and flaky as if a leaf is grounded with the thickness of around 2 $\mu$m, whose size was around 5 to 50 $\mu$m. This polychromic particle depending on viewing angle was used as a "polychromic particle I depending on viewing angle".

II. Trade name "HELICONE HC Maple SLM 90320", cholesteric liquid crystal polymer particles manufactured by Wacker-Chemie GmbH in Germany III. Trade name "Variochrom Magic Red L4420" manufactured by BASF Aktiengesellschaf IV. Trade name "HELICONE HC Sapphire SLM90020", cholesteric liquid crystal polymer particles manufactured by Wacker-Chemie GmbH in Germany V. Trade name "HELICONE HC Scarabeus SLM 90120", cholesteric liquid crystal polymer particles manufactured by Wacker-Chemie GmbH in Germany VI. Trade name "HELICONE HC Jade SLM 90220", cholesteric liquid crystal polymer particles manufactured by Wacker-Chemie GmbH in Germany Pearlescent Pigments I. Mica coated with titanium dioxide: trade name "Iriodin 219", manufactured by Merck Japan Ltd., II. Mica coated with titanium dioxide: trade name "Iriodin 100 Silver Pearl", manufactured by Merck Japan Ltd., Metallic Powder Pigments I. Aluminum paste: trade name "Alumi paste WXM0650", manufactured by TOYO ALUMINIUM K.K.

II. Aluminum paste: trade name "WJP-U75C", manufactured by TOYO ALUMINIUM K.K.

Shear-Thinning Property Imparting Agents

I. Succinoglycan: trade name "Reozan", manufactured by Sansho Co., LTD.,

II. Xanthane gum: trade name "Kelzan", manufactured by Kelco, a unit of Monsanto Company.

III. Rhamsan gum: trade name "Rhamsan", manufactured by Sansho Co., LTD.,

IV. Aluminum Soap (2-ethylhexaoic acid aluminum): trade name "8% Octope Alumi", manufactured by Hope Chemical Co., LTD Binder Components I. CMC (carboxymethyl cellulose): trade name "Cellogen 7A", manufactured by DAI-ICHI KOGYO SEIYAKU CO., LTD II. PVP (polyvinyl pyrrolidone): trade name "PVP K-30", manufactured by ISB Japan Co., Ltd., III. Polyacrylic acids: trade name "Carbopole 940", manufactured by B. F.Coodrich Co., IV. Oil soluble resin (alkyl phenol resin): trade name "Tamanol 510", manufactured by ARAKAWA CHEMICAL INDUSTRIES. LTD., Antiseptic Mildew-Proofing Agent I. 1,2-Benzoisothiazolin-3-on: trade name "Proxell GXL", Hoechst Synthesics Co., Ltd., Rust-inhibitor I. Benzotriazole Lubricants I. Maleic monoamide II. POE alkyl ether phosphate ester Surfactant/Penetrating-thickening agent I. Surfactant (Sorbitan monolaurate): trade name "Rheodol SP-L10" manufactured by Kao Corp.

II. Polyglicerin fatty acid esters: trade name "SY Glister ML-500" manufactured by Sakamoto Yakuhin Kogyo Co., Ltd., Wetting agent I. Glicerin: trade name "Glicerin" manufactured by Sakamoto Yakuhin Kogyo Co., Ltd., Colorant I: Acid yellow dye: trade name "Kiiro 202-(1)" C.I. Acid Yellow 73, Aizen Co., Ltd., II: Acid yellow dye: trade name "Kayaku Tartrazine"C.I. Acid Yellow 23, NIPPON KAYAKU CO., LTD., III: Aqueous black pigment colorant dispersion:

Carbon black (C.I. Pigment Black 7): 10% by weight

Styrene-acrylic acid copolymer resin: 2% by weight neutralized by ammonium

Water: 88% by weight

IV: Aqueous brown pigment colorant dispersion:

Trade name "Hosterperm Brown HFR 01" C.I. Pigment Brown 25, Clariant Japan Co., Ltd.,: 10% by weight Styrene-acrylic acid copolymer resin: 2% by weight neutralized by ammonium Water: 88% by weight V: Aqueous blue pigment dispersion:

Blue pigment dispersion with average particle diameter of 0.06 $\mu$m and solid matter concentration of 30% by weight was prepared by adding and dissolving sodium hydroxide to a mixture obtained by mixing and conducting dispersion with a ball mill:

25 parts by weight of phthalocyanine blue (C.I. Pigment Blue 15:3)

5 parts by weight of styrene acryl copolymer (trade name: JOHNCRYL J 683, manufactured by Johnson Co., LTD., average molecular weight=8000)

VI: Water soluble black dye: trade name "DUASYN D.BLACK HEF-SF liq" manufactured by Clariant Japan Co., Ltd., VII: Oil soluble black dye (nigrosine): trade name "Oil Black 2030" manufactured by Chuo Synthetic Chemical Co., VIII: Aqueous blue pigment dispersion:

Pigment base with the average particle diameter of 0.08 $\mu$m and said solid matter concentration of 10% by weight By casting phthalocyanine blue (C.I.Pigment Blue 15:3) and dispersant (styrene acryl copolymer) in the proportion of 5:1 (ratio of parts by weight) into ion exchange water and thereafter conducting dispersion with a ball mill by adding sodium hydroxide.

Water Soluble Organic Solvent
I: Glicerin
Organic Solvent
I: Ethylalcohol
II: Methyl cyclohexane Preparation of Test Samples 1

Next, each of the ink compositions of the Examples and the Comparative Examples given in Tables 1 and 2 was filled into each of the ink containers made of a translucent hollow polypropylene tube equipped with a ball-point pen tip connected to one end made of stainless steel (ball material: silicon carbide), and ball-point pens for test samples having the ink containers therein were prepared.

Evaluation Test 1

Polychroism depending on viewing angle of written marks on each substrate was evaluated by writing on commercially available white drawing paper and black drawing paper with these ball-point pens.

Evaluation of polychroism depending on viewing angle was conducted by visual observation of writing conditions. Rating criteria were: ○ for ones in which different colors are to be seen depending on viewing angle; X for ones having little polychroism depending on viewing angle or ones in which different colors are not to be seen depending on viewing angle. The result was shown in Table 3.

In the Table, written marks on white drawing paper of each ink composition were written marks studded with glittering polychromic parts depending on viewing angle which a glitter and polychromic parts depending on viewing angle were studded which accompanies a spatial effect as well.

available) made of colorless and transparent glass equipped with a bar-shaped body with a brush.

Evaluation Test 2

Polychroism depending on viewing angle of coated parts was evaluated by writing on commercially available white drawing paper with these ink compositions packed in the manicure containers. In addition, polychroism depending on viewing angle of the containers themselves was evaluated.

Evaluation of polychroism depending on viewing angle was conducted by visual observation of writing conditions. Rating criteria were: ○ for ones in which different colors are to be seen depending on viewing angle; X for ones having little polychroism depending on viewing angle or ones in which different colors are not to be seen depending on viewing angle. The result was shown in Table 4.

Further, the ink compositions filled in the manicure containers were left to stand at a room temperature for two weeks, and polychroism depending on viewing angle of the appearance of the container and dispersibility of the pigments used thereafter were evaluated. The evaluation of polychroism depending on viewing angle is based on the criteria described above. Likewise, the evaluation of dispersibility was conducted by visual observation. Rating criteria were: "No change" for ones without sedimentation of pigments or supernatant liquid; "Supernatant liquid" for ones generating supernatant liquid by the sedimentation of pigments; and "precipitation" for ones with pigments precipitated at the bottom of the containers. The result was shown in Table 4. From the result, it can be said that the shear-thinning property imparting agents clearly have an effect on dispersal maintenance, which further affects the designs of the appearance of the containers.

TABLE 3

| Example | On black drawing paper | On white drawing paper | Appearance of the container | (Change in color) |
|---|---|---|---|---|
| 1 | ○ | ○ | ○ | Green to purple |
| 2 | ○ | ○ | ○ | Green to purple |
| 3 | ○ | ○ | ○ | Green to purple |
| 4 | ○ | ○ | ○ | Copper red to green |
| 5 | ○ | ○ | ○ | Copper red to green |
| 6 | ○ | ○ | ○ | Copper red to green |
| 7 | ○ | ○ | ○ | Copper red to green |
| 8 | ○ | ○ | ○ | Yellow to red |
| 9 | ○ | ○ | ○ | Green to purple |
| 10 | ○ | ○ | ○ | Yellow to red |
| 11 | ○ | ○ | ○ | Blue to dark color |
| 12 | ○ | ○ | ○ | Green to blue |
| 13 | ○ | ○ | ○ | Green to blue |
| 14 | ○ | ○ | ○ | Gold to green |
| Comparative Example | | | | |
| 1 | ○ | X | X | Yellow green to purple |
| 2 | ○ | X | X | Yellow green to purple |
| 5 | X | X | X | No change |
| 6 | ○ | X | X | Yellow green to green |
| 7 | ○ | X | X | Yellow green to green |
| 10 | ○ | X | X | Yellow green to yellow |
| 11 | ○ | X | X | Yellow green to purple |
| 14 | ○ | X | X | Blue to dark color |
| 15 | ○ | X | X | Green to blue |
| 16 | ○ | X | X | Green to blue |

Preparation of Test Samples 2

Each of the ink compositions of Examples and Comparative Examples given in Tables 1 and 2 was filled into each of the containers of a manicure (manicure: commercially

TABLE 4

| | On white drawing paper | Appearance of the container Initial stage | After left to stand | Dispersability After left to stand |
|---|---|---|---|---|
| Example | | | | |
| 1 | ○ | ○ | ○ | No change |
| 2 | ○ | ○ | ○ | No change |
| 3 | ○ | ○ | ○ | No change |
| 4 | ○ | ○ | ○ | No change |
| 5 | ○ | ○ | ○ | No change |
| 6 | ○ | ○ | ○ | No change |
| 7 | ○ | ○ | ○ | No change |
| 8 | ○ | ○ | ○ | No change |
| 9 | ○ | ○ | ○ | No change |
| 10 | ○ | ○ | ○ | No change |
| 11 | ○ | ○ | ○ | No change |
| 12 | ○ | ○ | ○ | No change |
| 13 | ○ | ○ | ○ | No change |
| 14 | ○ | ○ | ○ | No change |
| Comparative Example | | | | |
| 1 | X | X | X | Supernatant liquid |
| 2 | X | X | X | Supernatant liquid |
| 3 | X | X | X | Supernatant liquid |
| 4 | X | X | X | Supernatant liquid |
| 6 | X | X | X | Supernatant liquid |
| 8 | X | X | X | Supernatant liquid |
| 9 | X | X | X | Supernatant liquid |
| 10 | X | X | X | Supernatant liquid |
| 12 | X | X | X | Supernatant liquid |
| 13 | X | X | X | Supernatant liquid |
| 17 | ○ | ○ | X | Precipitation |
| 18 | ○ | ○ | X | Precipitation |
| 19 | ○ | ○ | X | Precipitation |

TABLE 4-continued

| | Appearance of the container | | | |
|---|---|---|---|---|
| | On white drawing paper | Initial stage | After left to stand | Dispersability After left to stand |
| 20 | ○ | ○ | X | Precipitation |
| 21 | ○ | ○ | X | Precipitation |
| 22 | ○ | ○ | X | Precipitation |

Preparation of Test Samples 3

Each of the ink compositions of Examples and Comparative Examples given in Table 5 was impregnated into sponges and stamps of each test sample equipped with these containers of ink compositions were prepared.

Evaluation Test 3

With these stamps, stamping was conducted on postcard paper whose substrate is white and polychromic depending on viewing angle of each ink composition on the stamping marks (coating films) were evaluated by visual observation. Rating criteria were: ○ for ones having strong polychromic depending on viewing angle; Δ for ones having little polychromic depending on viewing angle; and X for ones having no polychromic depending on viewing angle. The result was shown in Table 5.

Preparation of Test Samples 4

10 cc of each ink composition shown in Table 5 was packed in the glass bottle of 15 cc.

Evaluation Test 4

The uniformity of the inks of these samples which were left to stand at a temperature of 50° C. for seven days was evaluated by visual observation. Rating criteria were: ○ for ones without any change; Δ for ones in which ununiformity of the ink was slightly recognized; and X for ones with complete ununiformity. The result was shown in Table 5.

TABLE 5

| | | | Example | | | | Comparative Example | | | | | | |
|---|---|---|---|---|---|---|---|---|---|---|---|---|---|
| | | | 15 | 16 | 17 | 18 | 23 | 24 | 25 | 26 | 27 | 28 | 29 |
| Polychromic particles depending on viewing angle | I | | | | | | | | | | | | |
| | II | | | | | | | | | | | | |
| | III | | 10 | 10 | 10 | 10 | | | 10 | 2 | 50 | 10 | 10 |
| Pearlescent pigment | I | | | | | | | | | | | | |
| | II | | | | | | | 10 | | | | | |
| Metallic powder pigment | I | | | | | | 10 | | | | | | |
| | II | | | | | | | | | | | | |
| Shear-thinning property imparting agent | I | | | | | | | | | | | | |
| | II | | | | | | | | | | | | |
| | III | | | | | | | | | | | | |
| | IV | | | | | | | | | | | | |
| Binder component | I | | | | | | | | | | | | |
| | II | | | | | | | | | | | | |
| | III | | | | | | | | | | | | |
| | IV | | | | | | | | | | | | |
| Antiseptic mildew proofing agent | I | | | | | | | | | | | | |
| Rust-inhibitor | I | | | | | | | | | | | | |
| Lubricant | I | | | | | | | | | | | | |
| | II | | | | | | | | | | | | |
| Surfactant/ Penetrating, thickening agent | I | | | | | | | | | | | | |
| | II | | 29.29 | 27.55 | 27.81 | 27.81 | 29.29 | 29.29 | 27.81 | 27.55 | 27.55 | 5 | 70 |
| Wetting agent | I | | 46.92 | 48.23 | 48.4 | 48.4 | 46.92 | 46.92 | 48.4 | 48.23 | 21.95 | 48.23 | 19.5 |
| Colorant | I | | | | | | | | | | | | |
| | II | | | | | | | | | | | | |
| | III | | | | | | | | | | | | |
| | IV | | | | | | | | | | | | |
| | V | | | 0.5 | 5 | 10 | | | 12 | 0.5 | 0.5 | 0.5 | 0.5 |
| | VI | | | | | | | | | | | | |
| | VII | | | | | | | | | | | | |
| | VIII | | | | | | | | | | | | |
| Water-soluble organic solvent | I | | | | | | | | | | | | |
| Water | | | 13.79 | 13.72 | 8.79 | 3.79 | 13.79 | 13.79 | 1.79 | 21.72 | 0 | 36.27 | 0 |
| Organic solvent | I | | | | | | | | | | | | |
| | II | | | | | | | | | | | | |
| Total | | | 100 | 100 | 100 | 100 | 100 | 100 | 100 | 100 | 100 | 100 | 100 |
| polychroism dependent on viewing angle | On white postcard pap | | ○ | ○ | ○ | Δ | ○ | X | X | X | — | ○ | — |
| Maintenance stability of the ink | | | ○ | ○ | ○ | ○ | X | ○ | ○ | ○ | ○ | X | ○ |

In the Table, the aqueous stamping ink using polychromic ink composition depending on viewing angle of the Examples could show beautiful and strong polychroism depending on viewing angle without any problem in the maintenance stability of the ink.

Since the present invention relates to the ink composition with polychromic particles depending on viewing angle, in particular, with polychromic particles depending on viewing angle having optical reflection layer(s), preferably flaky and smooth polychromic particles depending on viewing angle, written marks or coating films with polychromic particles depending on viewing angle can be obtained that have not been realized by the conventional metallic pigments or pearlescent pigments. In addition, since the ink composition of the present invention relates to the ink composition containing solvents and shear-thinning property imparting agents as well as the said particles, good dispersal stability of the said particles can be maintained, sedimentation of the said particles can be prevented, thereby capable of forming written marks or coating films with polychromic depending on viewing angle while showing the excellent maintenance stability. Therefore, the present invention can be applied for practical use. In particular, it can preferably be used for writing instruments including ball-point pens, stamps and paints. Further, the present invention can be used for cosmetics including facial cosmetics, cosmetics for make-up, cosmetics for hair, or the like. In particular, the present invention can preferably be used for manicures, pedicures, nail polishers, mascaras, eye liners, eye shadows, lip sticks, cheeks, foundations, or the like.

According to the ink of the present invention, since the present invention relates to the ink composition containing solvents and shear-thinning property imparting agents as well as the said particles, the said particles can be kept in a good dispersal stability state in the ink, thereby enabling written marks or coating films to be studded with polychromic particles depending on viewing angle. Therefore, according to the ink of the present invention, the method of forming written marks which glitter with a shift into several different colored interference colors depending on viewing angle can be employed.

In addition, likewise, since the said particles can be kept in a good dispersal stability state in the ink, when deep-colored coloring matters are contained in the ink, the said particles can be studded making the said deep-colored coloring matters of the said particles' substrate colors. Therefore, according to the ink of the present invention, the method of forming the written marks which glitter with a shift into several different colored interference colors depending on viewing angle can be employed. In other words, in the case of polychromic ink composition depending on viewing angle containing optical absorbents including deep-colored coloring matters, the ink itself deepens the colors of the substrate and strong polychroism depending on viewing angle can be realized even though the substrate initially has light colors, thereby capable of obtaining distinctive written marks or coating films which have never been realized. Therefore, in this case, method of forming written marks can be employed wherein polychromic particles depending on viewing angle which glitter with a shift into several different colored interference colors depending on viewing angle are studded making deep-colored coloring matters contained in the ink substrate colors. Therefore, compared with the ink composition using the conventional pearlescent pigments or the like, distinctive written marks or coating films with strong polychromic depending on viewing angle not affected by the colors of the substrate which have never been achieved can be obtained.

Further, when the ink of the present invention is the ink composition further containing colorants (pigments and/or dyes), since the said particles (and pigment particles) can be kept in a good dispersal stability state in the ink by shear-thinning property imparting agents, even strong glittery or spatial effect can be obtained in the written marks or coating films depending on the hue or the like of the colorants. For example, the method of forming written marks in which polychromic particles depending on viewing angle which glitter with a shift into several different colored interference colors depending on viewing angle are studded among colorant particles contained in the ink thereby realizing polychroism depending on viewing angle interference colors depending on the hue of the colorants can be adopted.

In addition, method of forming written marks can be employed wherein polychromic particles depending on viewing angle which glitter with a shift into several different colored interference colors depending on viewing angle are studded, realizing interference colors of polychroism depending on viewing angle depending on the hue of the colorants.

Further, since this polychromic ink composition depending on viewing angle contains solvents and shear-thinning property imparting agents as well as the said particles, the novel designs or the latest designs were realized with strong polychroism depending on viewing angle in the appearance of the container itself by containing the ink composition in the transparent or translucent container.

For example, ball-point pens or cosmetics (in particular, manicures) can be employed wherein the ink containing polychromic particles depending on viewing angle which glitter with a shift into several different colored interference colors depending on viewing angle is filled in the transparent or translucent ink container and the ink container glitters with a shift into several different colored interference colors depending on viewing angle. Further, in addition, ball-point pens or cosmetics (in particular, manicures) containing polychromic particles depending on viewing angle which glitter with a shift into several different colored interference colors depending on viewing angle in the resin mold body of the transparent or translucent ink container can be employed.

Thus, polychromic ink composition depending on viewing angle containing shear-thinning property imparting agents is capable of preventing the sedimentation of polychromic particles depending on viewing angle, which contributes not only to the maintenance of quality including writing characteristics or the like for a long time but also to the maintenance of designs of ink containers themselves. In particular, in the case of polychromic particles depending on viewing angle with large specific gravity (including multi-layered particles containing metal and/or metal oxide) and cholesteric crystal liquid polymer particles with large particle diameter, it is important to contain shear-thinning property imparting agents.

The present application claims priority of Japanese application No.2000-112589, No.2000-277752, No.2000-312595, No.2000-348558, and No.2000-391415 the disclosures of which are incorporated herein by reference. While a detailed description of the invention has been provided above, the present invention is not limited thereto and various modifications will be apparent to those of skill in the art. The invention is defined by the claims that follow.

What is claimed is:

1. An ink composition exhibiting polychromic behavior depending on viewing angle, comprising particles tat are polychromic depending on viewing angle, a solvent, and a shear-thinning property imparting agent, wherein the particles comprise at least one optical reflection layer; wherein the particles are selected from the group consisting of cholesteric liquid crystal polymer particles and particles having an optical reflection layer of a metallic layer.

2. An ink composition exhibiting polychromic behavior depending on viewing angle, comprising particles that are polychromic depending on viewing angle, a solvent, and a shear-thinning property imparting agent, wherein the particles comprise at least one optical reflection layer, wherein the particles are multi-layered particles, wherein the particle is a smooth flake comprising at least one base layer having an optical specular reflection plane and coating layers which create an interference pattern of light, wherein the base layer comprises a metallic film reflecting specularly and the coating layers comprise at least two species of metals or metallic compound films whose refractive index is different.

3. An ink composition as set forth in claim 2, wherein the base layer comprises at least one aluminum film and the coating layers comprise a magnesium fluoride film at the side of the base layer and a chrome film at the opposite side of the base layer.

4. An ink composition as set forth in claim 2, wherein the base layer comprises aluminum film, and the coating layers comprise $SiO_2$ films at the side of the base layer and $Fe_2O_3$ films at the opposite side of the base layer.

5. An ink composition as set forth in claim 1, wherein the particles are cholesteric liquid crystal polymer particles.

6. An ink composition as set forth in claim 2, wherein the maximum particle diameter of the particles is 1 to 200 μm.

7. An ink composition as set forth in claim 2, wherein particles are contained in 0.5 to 40% by weight with respect to the total amount of the ink composition.

8. An ink composition as set forth in claim 2 further containing a deep colored coloring matter which absorbs transmitted light through the particles depending on viewing angle.

9. An ink composition as set forth in claim 5 further containing a deep colored coloring matter which absorbs transmitted light through the particles depending on viewing angle.

10. An ink composition as set forth in claim 8, wherein the deep colored coloring mater is selected from black colors, deep colors, or dark colors of coloring matters with the brightness value of not greater than 4 which is provided by JIS Z 8102 (1985).

11. An ink composition as set forth in claim 10, wherein the deep colored coloring mater is a pigment and or a dye.

12. An ink composition as set forth in claim 11, wherein the pigment of a deep colored coloring matter comprises 0.05 to 20% by weight with respect to the total amount of the ink composition.

13. An ink composition as set forth in claim 11, wherein the dye of a deep colored coloring matter comprises 0.05 to 20% by weight with respect to the total amount of the ink composition.

14. An ink composition as set forth in claim 11, wherein the pigment of a deep colored coloring matter has an average diameter of 0.01 to 0.5 μm and is dispersed in the solvent.

15. An ink composition as set forth in claim 2, wherein the solvent is water, the shear-thinning property imparting agent is a polysaccharide, and the polysaccharide comprises 0.01 to 5.0% by weight with respect to the total amount of the ink composition.

16. An ink composition as set forth in claim 15, wherein the polysaccharide is a microbial polysaccharide and the derivatives thereof selected from pullulan, xanthane gum, welan gum, rhamsan gum, succinoglucan and dextran.

17. An ink composition as set forth in claim 2, wherein the solvent is water, the shear-thinning property imparting agent is a non-pigment gelling agent, and the non-pigment type gelling agent comprises 0.01 to 20.0% by weight with respect to the total amount of the ink composition.

18. An ink composition as set forth in claim 17, wherein the non-pigment gelling agent is a metallic soap.

19. An ink composition as set forth in claim 2, further containing a binder resin.

20. An ink composition as set forth in claim 2, further containing a colorant.

21. A stamping ink composition exhibiting polychromic behavior depending on viewing angle, comprising particles that are polychromic depending on viewing angle, a solvent, a penetrating-thickening agent, a pigment and/or a dye; wherein the polychromic particles comprise a metallic optical specular reflection plane.

22. A stamping ink composition as set forth in claim 21, wherein the particles comprise 3.0 to 40% by weight with respect to the total amount of the ink composition.

23. A stamping ink composition as set forth in claim 22, wherein the penetrating-thickening agent is a nonionic surfactant.

24. A stamping ink composition as set forth in claim 23, wherein the penetrating-thickening agent consisting of a nonionic surfactant comprises 10.0 to 60.0% by weight with respect to the total amount of the ink composition.

25. A stamping ink composition as set forth in claim 21, wherein the pigment and/or dye comprises not greater than 10.0% by weight with respect to the total amount of the ink composition.

26. A stamping ink composition as set forth in claim 21, wherein the particle diameter of the particles is not greater than 500 μm, and the average diameter of the pigment and/or dye is 0.08 to 0.4 μm.

27. Writing instruments, stamps, paints, and cosmetics which contain ink comprising particles exhibiting polychromic behavior depending on viewing angle with optical reflection layers, binder resins, solvents, colorants, and shear-thinning property imparting agents; wherein the particles comprise a metallic optical specular reflection plane.

28. The writing instruments, stamps, paints, and cosmetics of claim 27, wherein the ink is contained in a transparent or translucent container.

29. A ball-point pen comprising composition of claim 2 and an ink container.

30. A ball-point pen wherein the aqueous ink comprising cholesteric liquid crystal polymer particles, an optical absorbent, a binder resin, water, a colorant, and a shear-thinning property imparting agent is filled in an ink container.

31. A ball-point pen comprising the ink composition of claim 2 and a transparent or translucent ink container, wherein the ink composition is filled in the transparent or translucent ink container and the ink container glitters with a shift into several different colored interference colors depending on viewing angle.

32. A ball-point pen comprising a transparent or translucent ink container with a resin molding body and the ink composition of claim 2, wherein the ink composition glitters with a shift into several different colored interference colors depending on viewing angle in the resin molding body of the transparent or translucent ink container.

33. A method of forming a written mark which is studded with the polychromic particles depending on viewing angle which glitter with a shift into several different colored interference colors depending on viewing angle.

34. A method of forming a written mark which is studded with the polychromic particles depending on viewing angle which glitter with a shift into several different colored interference colors depending on viewing angle among the colorant particles contained in the ink and the interference colors depending on viewing angle by the hue of the colorant are realized in the written mark.

35. A method of forming a written mark which is studded with the polychromic particles depending on viewing angle which glitter with a shift into several different colored interference colors depending on viewing angle with the colorant contained in the ink as a substrate color and the interference colors depending on viewing angle by the hue of the colorant are realized in the written mark.

36. A method of forming a written mark which is studded with the polychromic particles depending on viewing angle which glitter with a shift into several different colored interference colors depending on viewing angle with the deep-colored coloring matters contained in the ink as substrate colors.

37. A ink composition exhibiting polychromic behavior depending on viewing angle comprising particles which are polychromic depending on viewing angle, a solvent, and a shear-thinning property imparting agent, wherein the particles comprise one or more optical reflection layers with a metallic specular surface.

* * * * *